US010799967B1

(12) United States Patent
Jenkins

(10) Patent No.: US 10,799,967 B1
(45) Date of Patent: Oct. 13, 2020

(54) DIAMOND WIRE SAW APPARATUS

(71) Applicant: Nicholas J. T. Jenkins, Dubois, WY (US)

(72) Inventor: Nicholas J. T. Jenkins, Dubois, WY (US)

(*) Notice: Subject to any disclaimer, the term of this patent is extended or adjusted under 35 U.S.C. 154(b) by 0 days.

(21) Appl. No.: 16/552,538

(22) Filed: Aug. 27, 2019

(51) Int. Cl.
B23D 57/00 (2006.01)
E21B 29/12 (2006.01)

(52) U.S. Cl.
CPC ..... B23D 57/0038 (2013.01); B23D 57/0007 (2013.01); B23D 57/0053 (2013.01); B23D 57/0069 (2013.01); B23D 57/0084 (2013.01); E21B 29/12 (2013.01)

(58) Field of Classification Search
CPC ............ B24D 57/0038; B24D 57/0007; B24D 57/0053; B24D 57/0069; E21B 29/12
See application file for complete search history.

(56) References Cited

U.S. PATENT DOCUMENTS

| 180,344 A | 7/1876 | Huffman | |
| 1,842,114 A | 1/1932 | Pratt | |
| RE26,793 E | 2/1970 | Patterson et al. | |
| 5,361,748 A * | 11/1994 | Matteucci | B23D 53/003 125/21 |
| 6,513,514 B1 * | 2/2003 | Micheletti | B23D 57/0069 125/16.02 |
| 8,286,625 B2 | 10/2012 | Jenkins | |
| 8,360,047 B2 * | 1/2013 | Pedrini | B23D 57/0023 125/13.02 |
| 8,746,228 B2 | 6/2014 | Jenkins | |
| 2004/0025660 A1 | 2/2004 | Behne | |
| 2007/0023027 A1 | 2/2007 | Nakai et al. | |
| 2007/0227322 A1 | 10/2007 | Shibuya | |
| 2007/0267006 A1 | 11/2007 | Ogyu | |
| 2014/0157964 A1 * | 6/2014 | Davis | B23D 57/0084 83/56 |
| 2017/0320150 A1 * | 11/2017 | Ramfjord | B26D 1/547 |
| 2019/0176252 A1 * | 6/2019 | Ramfjord | B23D 57/0007 |

FOREIGN PATENT DOCUMENTS

WO 2009/146294 A1 12/2009

* cited by examiner

Primary Examiner — Dung Van Nguyen
(74) Attorney, Agent, or Firm — Bush Intellectual Property Law; Kenneth M. Bush

(57) ABSTRACT

In various aspects, the diamond wire saw apparatus disclosed herein includes a frame formed in a U-shape from a first rail and a second rail secured to a base, the first rail and the second rail being parallel to one another and perpendicular to the base. Several pulleys are disposed about the frame, and a diamond wire is engaged with the several pulleys to be cycled about the several pulleys. Some of the several pulleys traverse portions of the frame in opposing directions to maintain a selected tension in the diamond wire as the diamond wire is advanced while being cycled to cut a workpiece releasably engaged with the frame. The first rail, the second rail, and the base are formed in sections to be sized to correspondingly size an interior region of the frame to accommodate a workpiece by selective inclusion of sections in the first rail, the second rail, and the base.

17 Claims, 8 Drawing Sheets

DIAMOND WIRE SAW APPARATUS

BACKGROUND OF THE INVENTION

Field

This disclosure relates to diamond wire saw apparatus and, more particularly, to diamond wire saw apparatus having a continuous diamond wire driven by a plurality of drive wheels, and suitable for various cutting applications including underwater applications.

Background

Diamond wire saw devices have been used, for example, in structural renovations or in the demolition of structures. For example, diamond wire saw devices may be used for selective cutting and removals of portions of large concrete and steel structures during renovation of such structures. Diamond wire saw devices may be used during the decommissioning of nuclear power plants or the demolition of large structures such as factories, power plants, and commercial buildings.

As additional examples, diamond wire saw devices may be used in underwater applications during renovation or demolition of port facilities, bridge piers, underwater pipelines, and hydrocarbon extraction related equipment including oil platforms. Examples of such underwater applications include precision cutting single and multi-string conductors, jacket legs, stringers, pipelines, seabed umbilicals, slot recovery, risers, wellheads, jacket foundations, piles, mooring chains, and links. In addition to demolition, marine applications of diamond wire saw devices may include cutting related to maintenance or upgrades of marine structures, module removals, topside removals, crane pedestal modifications, lifting lugs removals, and hurricane remediation.

Despite the wide variety of workpieces that diamond wire saw devices are used to cut, existing diamond wire saw devices are typically made in a specific size that accommodates workpieces having a limited range of sizes. Accordingly, different diamond wire saw devices having differing sizes are utilized as larger or smaller workpieces are cut during the course of a project. This assortment of differing sized diamond wire saw devices must be purchased, maintained, and transported to and from the project site.

Accordingly, there is a need for improved diamond wire saw apparatus for cutting workpieces of differing sizes during the course of a project as well as related methods of use.

BRIEF SUMMARY OF THE INVENTION

These and other needs and disadvantages may be overcome by the diamond wire saw apparatus and related methods of use disclosed herein. Additional improvements and advantages may be recognized by those of ordinary skill in the art upon study of the present disclosure.

In various aspects, the diamond wire saw apparatus includes a frame formed in a U-shape from a first rail and a second rail secured to a base, the first rail and the second rail being parallel to one another and perpendicular to the base. Several pulleys are disposed about the frame, and a diamond wire is engaged with the several pulleys to be cycled about the several pulleys, in various aspects. Portions of the several pulleys traverse portions of the frame in opposing directions to maintain a selected tension in the diamond wire as the diamond wire is advanced while being cycled to cut a workpiece releasably engaged with the frame, in various aspects. The first rail, the second rail, and the base are formed in sections to be sized to accommodate a workpiece within an interior region of the frame by selective inclusion of sections in the first rail, the second rail, and the base, in various aspects.

This summary is presented to provide a basic understanding of some aspects of the apparatus and methods disclosed herein as a prelude to the detailed description that follows below. Accordingly, this summary is not intended to identify key elements of the apparatus and methods disclosed herein or to delineate the scope thereof.

Figure 1:
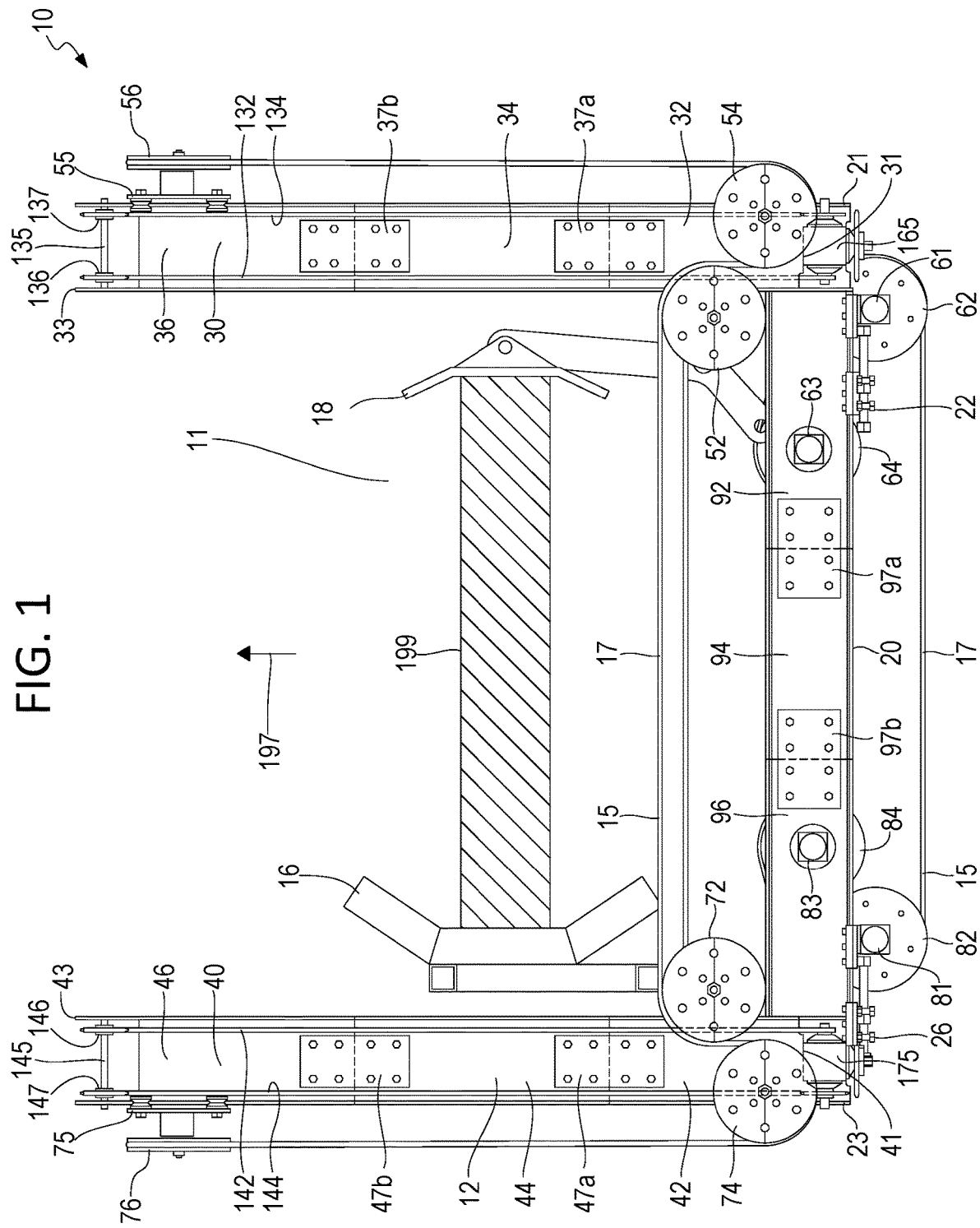
FIG. 1 illustrates by top plan view an exemplary implementation of a diamond wire saw apparatus.

The Figures are exemplary only, and the implementations illustrated therein are selected to facilitate explanation. The number, position, relationship and dimensions of the elements shown in the Figures to form the various implementations described herein, as well as dimensions and dimensional proportions to conform to specific force, weight, strength, flow and similar requirements are explained herein or are understandable to a person of ordinary skill in the art upon study of this disclosure. Where used in the various Figures, the same numerals designate the same or similar elements. Furthermore, when the terms "top," "bottom," "right," "left," "forward," "rear," "first," "second," "inside," "outside," and similar terms are used, the terms should be understood in reference to the orientation of the implementations shown in the drawings and are utilized to facilitate description thereof. Use herein of relative terms such as generally, about, approximately, essentially, may be indicative of engineering, manufacturing, or scientific tolerances such as ±0.1%, ±1%, ±2.5%, ±5%, or other such tolerances, as would be recognized by those of ordinary skill in the art upon study of this disclosure.

DETAILED DESCRIPTION OF THE INVENTION

FIG. 1 illustrates exemplary diamond wire saw apparatus 10 that includes base 20 and rails 30, 40. As illustrated in FIG. 1, ends 31, 41 of rails 30, 40 are secured to ends 21, 23 of base with rails 30, 40 generally in parallel alignment with one another and rails 30, 40 oriented generally perpendicular to base 20. Accordingly, rails 30, 40 and base 20 form frame 12 that generally has a U-shape with interior region 11 defined by rails 30, 40 and base 20, as illustrated in this implementation.

As illustrated in FIG. 1, clamp arms 16, 18 are operatively connected with frame to engage workpiece 199 by biasing workpiece 199 between clamp arms 16, 18 thereby securing frame 12 to workpiece 199. Clamp arms 16, 18 are positionable with respect to one another to either bias compressionably workpiece 199 between clamp arms 16, 18 in order to secure frame 12 to workpiece 199 prior to cutting of workpiece 199, or release workpiece 199 from biased engagement with clamp arms 16, 18 in order to disengage frame 12 from workpiece 199, in this implementation. Clamp arms 16, 18 may be, for example, pivotably connected to base 20 and positioned using a screw actuated mechanism, hydraulic actuator, or other mechanisms, as would be readily understood by those of ordinary skill in the art upon study of this disclosure.

Workpiece 199, for example, may be formed of concrete, reinforced concrete, various ceramic materials, metal such copper, aluminum, steel, various steel alloys, exotic alloys such as zircalloy, or combinations thereof. While workpiece 199 is illustrated as having a solid rectangular cross-section for explanatory purposes, it should be understood that workpiece 199 may assume any geometric shape and may include void(s) within, in various implementations.

Figure 2:
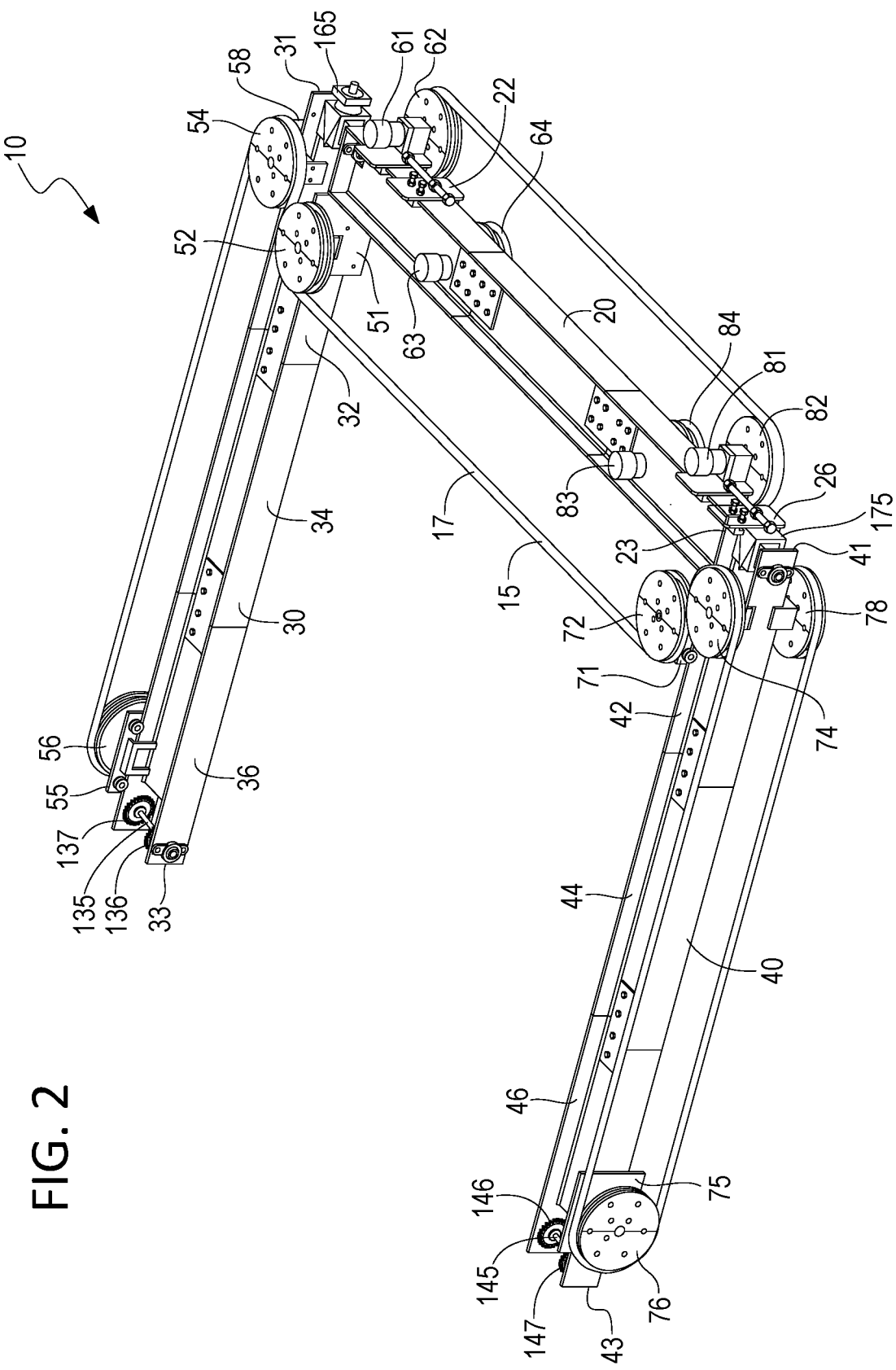
FIG. 2 illustrates by perspective view portions of the exemplary implementation of a diamond wire saw apparatus of FIG. 1.
Figure 3:
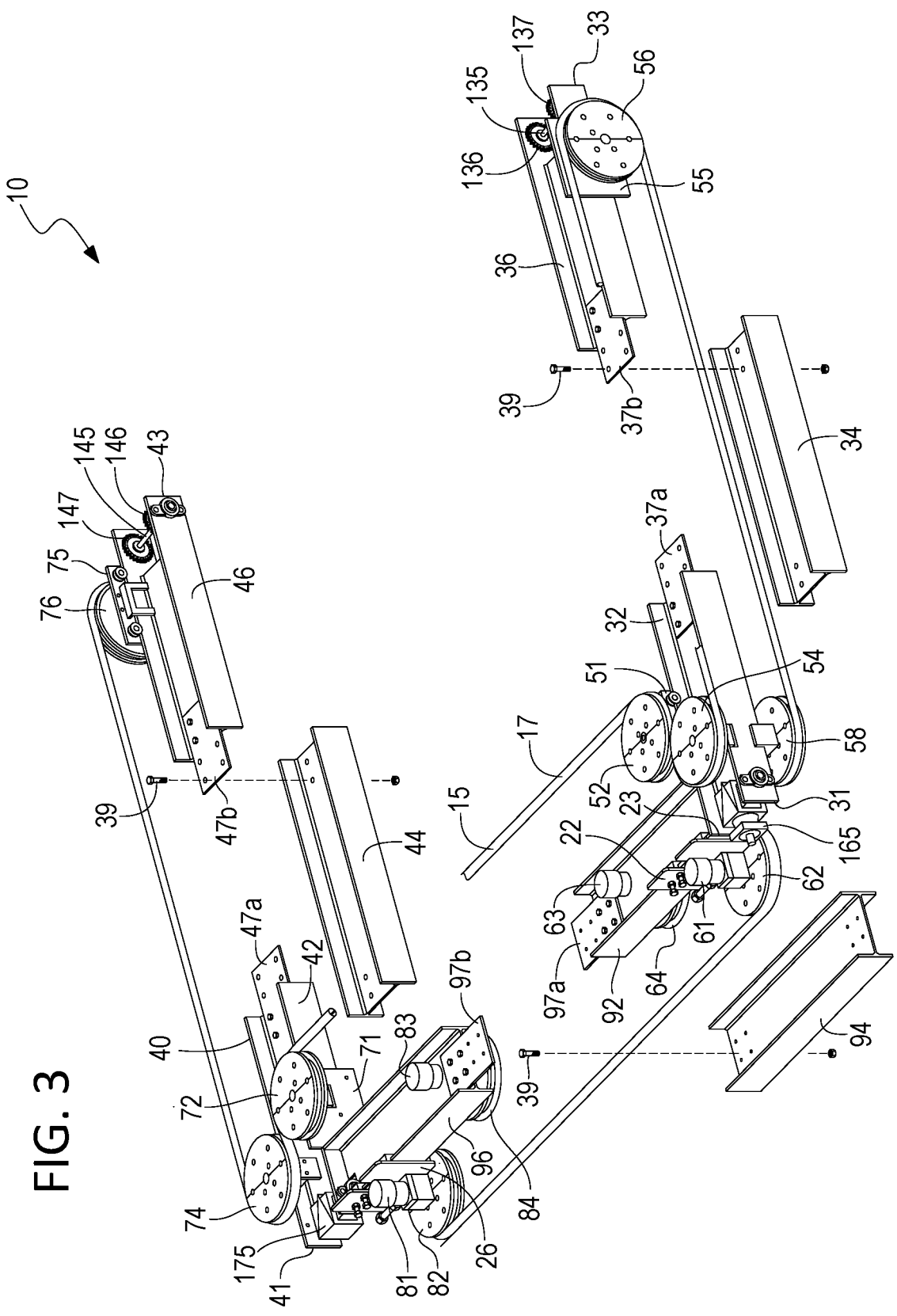
FIG. 3 illustrates by perspective view portions of the exemplary implementation of a diamond wire saw apparatus of FIG. 1.

As illustrated in FIGS. 1, 2, diamond wire 15 forms a closed loop 17 that is received on pulleys 52, 54, 56, 58, 62, 64, 72, 74, 76, 78, 82, 84 (also see FIG. 3) of frame 12. Pulleys 62, 64, 82, 84 fixedly mounted to base 20 are rotatably driven by hydraulic drive motors 61, 63, 81, 83, respectively, to cycle loop 17 of diamond wire 15, while pulleys 52, 54, 56, 58, 72, 74, 76, 78 may free-wheel as loop 17 of diamond wire 15 is cycled, as illustrated in FIG. 2. Hydraulic fluid may be provided at generally equal pressures and generally flow rates to hydraulic motors 61, 63, 81, 83 through various fluid pathways (not shown) to drive hydraulic motors 61, 63, 81, 83 and corresponding pulleys 62, 64, 82, 84 in unison. Pulleys 62, 82 are attached to base 20 by mounts 22, 26 (see FIG. 5), respectively, that adjustably position pulleys 62, 82 in order to tension diamond wire 15 at a selected tension. Pulleys, such as pulley 76, include a groove 68 and liner 69, as illustrated in FIGS. 4C, 4D. Liner 69 may be, for example, a 70 durometer heat spliced rubber doughnut having a diameter of eleven and one-half inches and a thickness of one and three-sixteenths inches. Grooves, such as grove 68, receive diamond wire 15, in this implementation. Liners, such as liner 69, surround diamond wire 15 to prevent slippage of diamond wire 15 at the pulleys thereby enabling constant cycling velocity of loop 17 around the pulleys during the cutting process, in this implementation.

Figure 6A:
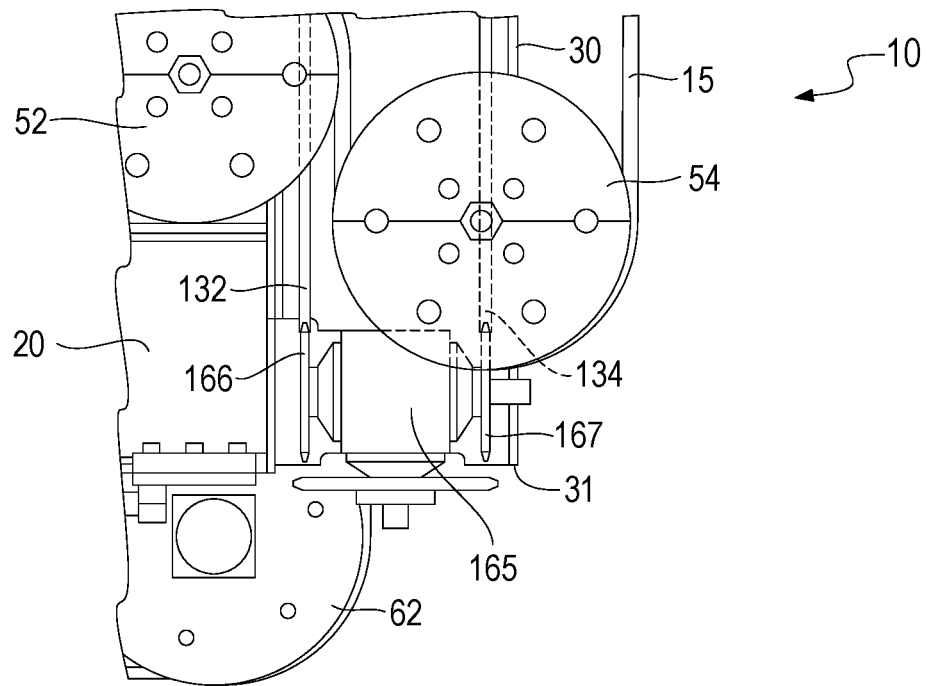
FIG. 6A illustrates by top plan view portions of the exemplary implementation of a diamond wire saw apparatus of FIG. 1; and, FIG. 6B illustrates by top plan view portions of the exemplary implementation of a diamond wire saw apparatus of FIG. 1.
Figure 6B:
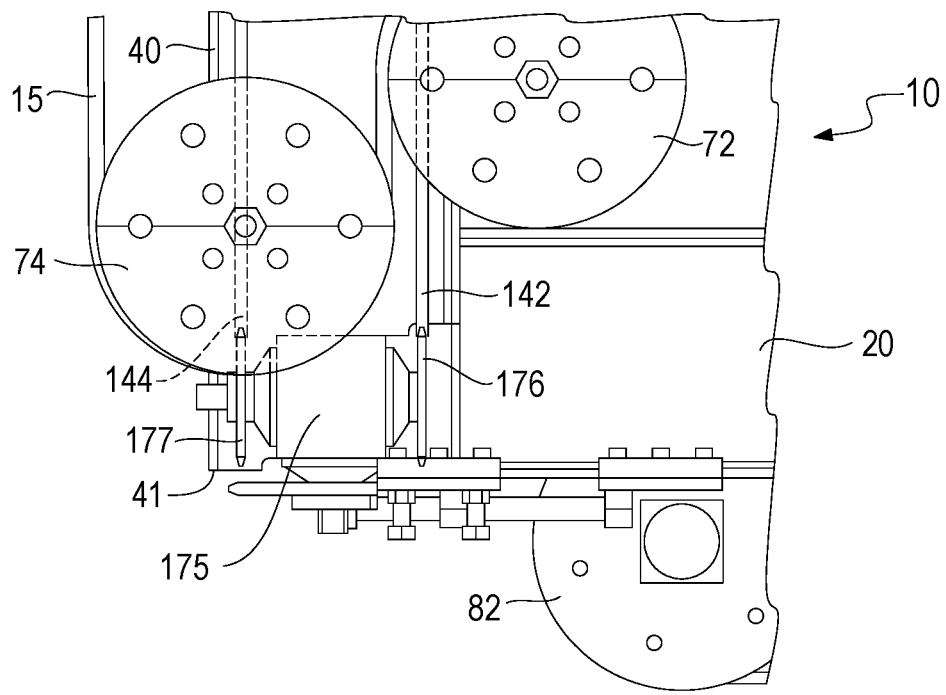

Pulleys 54, 58 are fixedly mounted to rail 30, and pulleys 74, 78 are fixedly mounted to rail 40, as illustrated in FIGS. 1, 2. Pulleys 52, 56, 72, 76 are attached to carriers 51, 55, 71, 75, respectively, as illustrated in FIGS. 1, 2. Carriers 51, 55 are slidably engaged with rail 30 to allow traversal of pulleys 52, 56 in opposite directions along rail 30 propelled by chains 132, 134, respectively, and carriers 71, 75 are slidably engaged with rail 40 to allow traversal of pulleys 72, 76 in opposite directions along rail 40 propelled by chains 142, 144, respectively, in this implementation. Chains 132, 134 are propelled by chain motor 165 and chains 142, 144 are propelled by chain motor 175, as illustrated in FIGS. 6A, 6B. Carriers 51, 71 and attached pulleys 52, 72 are traversed generally from ends 31, 41 of rails 30, 40 toward ends 33, 43 of rails 30, 40, respectively, to advance diamond wire 15 in direction indicated by arrow 197 in FIG. 1 concurrent with traversal of carriers 55, 75 and attached pulleys 56, 76 generally from ends 33, 43 toward ends 31, 41 to maintain constant tension in diamond wire 15. Diamond wire 15 cuts through workpiece 199 as diamond wire 15 is advanced in the direction indicated by arrow 197 while being cycled about pulleys 52, 54, 56, 58, 62, 64, 72, 74, 76, 78, 82, 84. Carriers 51, 71 and attached pulleys 52, 72 may be traversed generally from ends 33, 43 of rails 30, 40 toward ends 31, 41, respectively, concurrent with traversal of carriers 55, 75 and attached pulleys 56, 76 generally from ends 31, 41 toward ends 33, 43, respectively, to withdraw diamond wire 15 in a direction opposite to that indicated by arrow 197.

Diamond wire 15 is formed, for example, of steel cable such as aircraft cable with diamonds embedded therein to function as a saw, in this implementation. Various portions of frame 12 including clamp arms 16, 18, base 20, and rails 30, 40 may be formed of steel or other suitable metal(s) and materials, as would be readily recognized by those of ordinary skill in the art upon study of this disclosure.

Interior region 11 of frame 12 may be sized to accommodate workpiece 199 of various sizes. For example, interior region 11 may be increased to accommodate a large workpiece 199, and interior region 11 may be decreased to accommodate a small workpiece 199. As illustrated in FIG. 3, rail 30 includes end sections 32, 36 joined together by connector 34 interposed between end sections 32, 36, rail 40 includes end sections 42, 46 joined together by connector 44 interposed between end sections 42, 46, and base 20 includes end sections 92, 96 joined together by connector 94 interposed between end sections 92, 96. End section 32 includes pulleys 52, 54, 58 and is attached to end section 92 of base 20 that includes hydraulic drive motors 61, 63 and corresponding pulleys 62, 64, as illustrated. End section 36 forms end 33 and includes pulley 56, as illustrated. End section 42 includes pulleys 72, 74, 78 and is attached to end section 96 of base 20 that includes hydraulic drive motors 81, 83 and corresponding pulleys 82, 84, as illustrated. End section 46 forms end 43 and includes pulley 76, as illustrated.

As illustrated in FIG. 3, connector 34 is attached to end section 32 of rail 30 using one or more connector plates, such as connector plate 37a, and fasteners, such as fasteners 39, and connector 34 is attached to end section 36 of rail 30 using one or more connector plates, such as connector plate 37b and fasteners, such as fasteners 39. Fasteners, such as fastener 39, may be bolts as illustrated, or may be pins, screws, or other fasteners that may be removably received in connector plates 37a, 37b, connector 34, and end sections 32, 36 to allow connector 34 and end sections 32, 36 to be connected to one another and disconnected from one another. While one connector 34 is illustrated in FIG. 3, it should be understood that several connectors, such as connector 34, may be interposedly connected between end section 32 and end section 36 to adjust rail 30 to a desired length. Connector 34 may be omitted, in certain implementations, wherein end sections 32, 36 are connected to one another, for example, using connector plates, such as connector plates 37a, 37b, and fasteners, such as fasteners 39. Connector(s), such as connector 34, may be varyingly sized in order to allow adjustment of rail 30 to the desired length.

Similarly, as illustrated in FIG. 3, connector 44 is attached to end section 42 of rail 40 using one or more connector plates, such as connector plate 47a, and fasteners, such as fasteners 39, and connector 44 is attached to end section 46 of rail 40 using one or more connector plates, such as connector plate 47b and fasteners. Again, while one connector 44 is illustrated in FIG. 3 to adjust the length of rail 40, it should be understood that several connectors, such as connector 44, may be interposedly connected between end section 42 and end section 46 to adjust rail 40 to a desired length. Connector 44 may be omitted, in certain implementations, wherein end sections 42, 46 are connected to one another, for example, using connector plates, such as connector plates 47a, 47b, and fasteners, such as fasteners 39. Connector(s), such as connector 44, may be varyingly sized in order to adjust rail 40 to the desired length.

As illustrated in FIG. 3, connector 94 is attached to end section 92 of base 20 using one or more connector plates, such as connector plate 97a, and fasteners, such as fasteners 39, and connector 94 is attached to end section 96 of base 20 using one or more connector plates, such as connector plate 97b, and fasteners. It should be understood that, while one connector 94 is illustrated in FIG. 3 for adjustment of the length of base 20, several connectors, such as connector 94, may be interposedly connected between end section 92 and end section 96 to adjust base 20 to a desired length. Connector 94 may be omitted, in certain implementations, wherein end sections 92, 96 of base 20 are connected directly to one another, for example, using connector plates, such as connector plates 97a, 97b, and fasteners, such as fastener 39. Connector(s), such as connector 94, may be varyingly sized in order to adjust base 20 to the desired length.

Figure 4A:
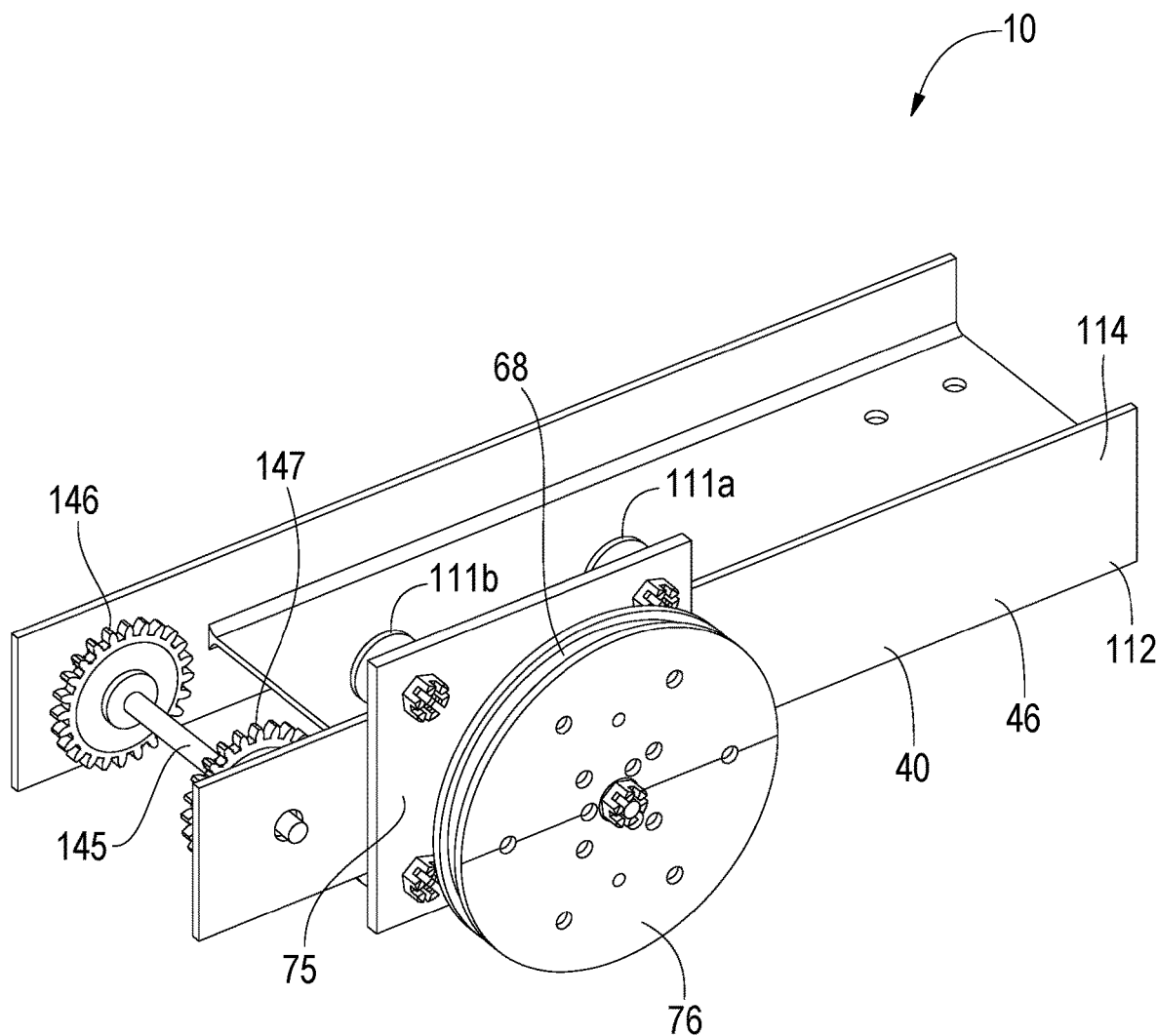
FIG. 4A illustrates by perspective view portions of the exemplary implementation of a diamond wire saw apparatus of FIG. 1.
Figure 4B:
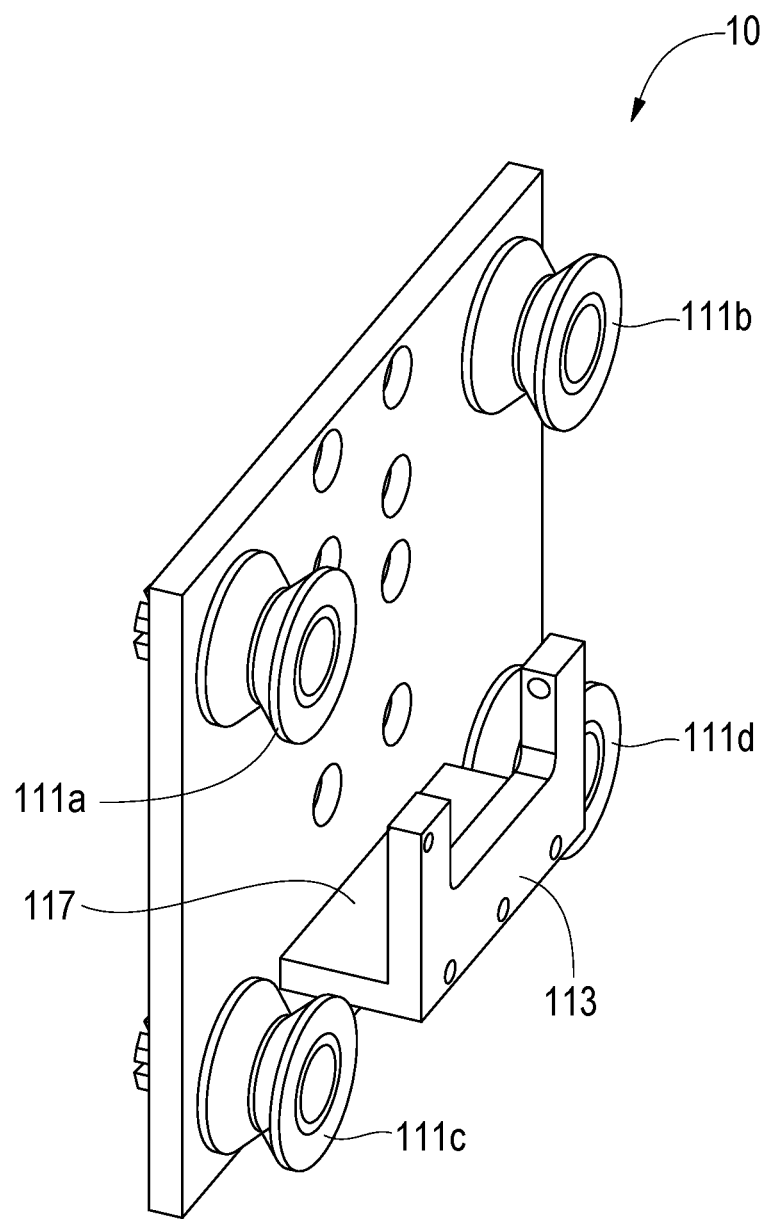
FIG. 4B illustrates by perspective view portions of the exemplary implementation of a diamond wire saw apparatus of FIG. 1.
Figure 4C:
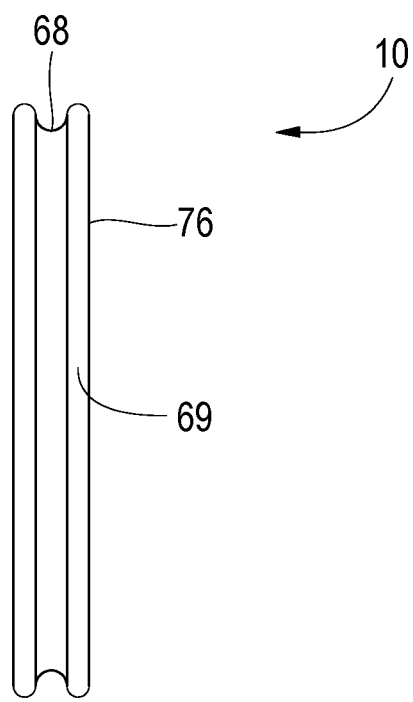
FIG. 4C illustrates by frontal view portions of the exemplary implementation of a diamond wire saw apparatus of FIG. 1.
Figure 4D:
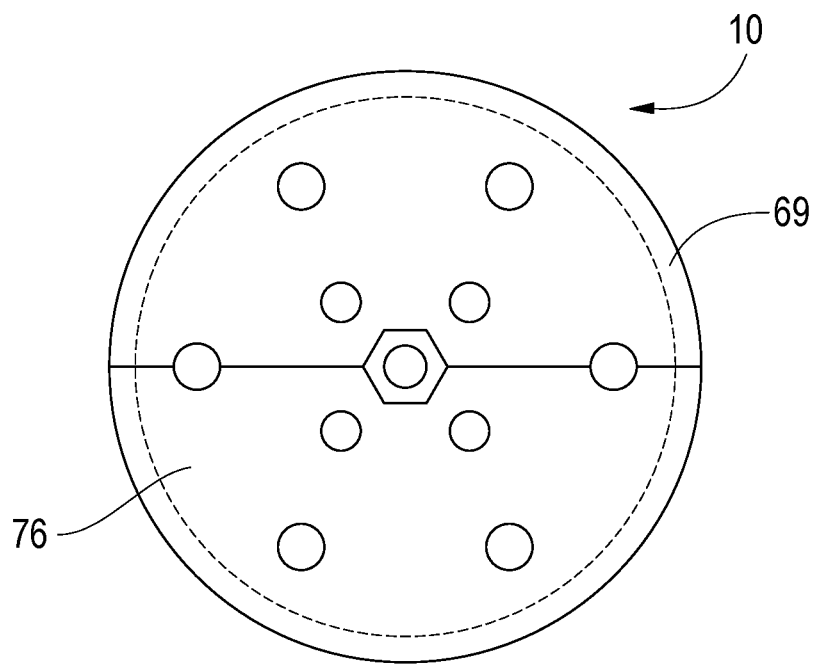
FIG. 4D illustrates by side view portions of the exemplary implementation of a diamond wire saw apparatus of FIG. 1.

FIGS. 4A, 4B illustrate carrier 75 slidably engaged with rail 40. As illustrated, pulley 76 is rotatably attached to carrier 75 and carrier 75 is positioned proximate end 43 of rail 40. Note that carriers 51, 55, 71 with corresponding pulleys 52, 56, 72 may be configured in a manner similar to that of carrier 75 with pulley 76, in this implementation. As illustrated in FIGS. 4A, 4B, rollers 111a, 111b, 111c, 111d have a V-shape. Rollers 111a, 111b rotatably engage flange 114 of rail 40 within the V-shape, and rollers 111c, 111d rotatably engage flange 112 of rail 40 within the V-shape to allow traversal of carrier 75 with attached pulley 76 along rail 40. Chain connector 113 forms channel 117 that slidably receives flange 112 of rail 40 therein, and chain connector 113 secures chain 144 to carrier 75 in order to allow chain 144 to traverse carrier 75 including pulley 76 along rail 40, in this implementation.

FIG. 4A also illustrates axle 145 engaged with rail 40 proximate end 43. Sprockets 146, 147 engage chains 142, 144, respectively, and freewheel as chains 142, 144 are cycled. Sprockets 136, 137, attached to axle 135, engage chains 132, 134, respectively, in a similar manner to that illustrated in FIG. 4A, and sprockets 136, 137 freewheel as chains 132, 134 are cycled.

Figure 5:
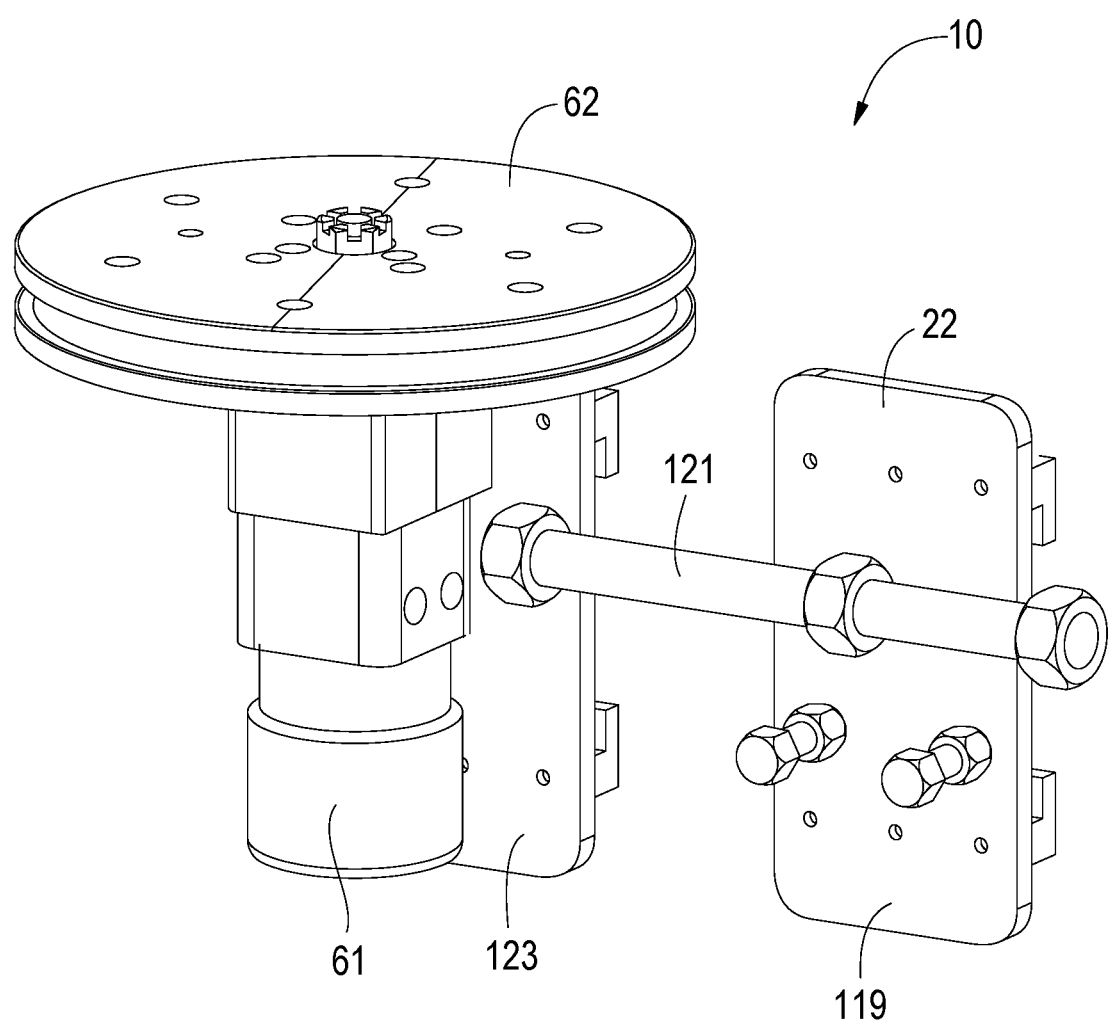
FIG. 5 illustrates by perspective view portions of the exemplary implementation of a diamond wire saw apparatus of FIG. 1.

FIG. 5 illustrates mount 22 that attaches pulley 62 to base 20. Mount 22 includes attachment plate 119 that is attached to base 20 by, for example, fastener or weld. Pulley 62 communicates with hydraulic drive motor 61 that provides power to rotate pulley 62. As illustrated, hydraulic drive motor 61 and pulley 62 are secured to support 123, that, in turn, is attached to attachment plate 119 by connector 121.

Connector 121 may be, for example, threaded to allow the position of pulley 62 to be adjusted with respect to attachment plate 119, and, thus, with respect to base 20. Accordingly, tension of diamond wire 15 may be adjusted to the selected tension by adjustment of the positions of pulleys 62, 82 with respect to base 20, mount 26 being formed similarly to mount 22.

FIG. 6A illustrates chain motor 165 located proximate end 31 of rail 30 to cycle chains 132, 134. As illustrated, sprockets 166, 167 mechanically communicate with chain motor 165 to be rotated under power by chain motor 165, and sprockets 166, 167 engage chains 132, 134, respectively. Accordingly, chain motor 165 cycles chain 132 by engagement with sprocket 166 about sprocket 136 (which freewheels) proximate end 33 of rail 30 to traverse carrier 51 with pulley 52 along rail 30, and chain motor 165 cycles chain 134 by engagement with sprocket 167 about sprocket 137 proximate end 33 of rail 30 to traverse carrier 55 with pulley 56 along rail 30. Note that carrier 51 with pulley 52 is traversed along rail 30 opposite to the traversal of carrier 55 with pulley 56 along rail 30 in order to maintain the selected tension in diamond wire 15.

FIG. 6B illustrates chain motor 175 located proximate end 41 of rail 40 to cycle chains 142, 144. As illustrated, sprockets 176, 177 mechanically communicate with chain motor 175 to be rotated under power by chain motor 175, and sprockets 176, 177 engage chains 142, 144, respectively. Accordingly, chain motor 175 cycles chain 142 by sprocket 176 about sprocket 146 (which freewheels) proximate end 43 of rail 40 to traverse carrier 71 with pulley 72 along rail 40, and chain motor 175 cycles chain 144 by sprocket 177 about sprocket 147 proximate end 43 of rail 40 to traverse carrier 75 with pulley 76 along rail 40. Note that carrier 71 with pulley 72 is traversed along rail 40 opposite to the traversal of carrier 75 with pulley 76 along rail 40 in order to maintain the selected tension in diamond wire 15.

Chain motors 165, 175 are hydraulic powered, in this implementation, and are operationally synchronized with one another so that carriers 51, 71 with attached pulleys 52, 72 are traversed equally along rails 30, 40, respectively, to maintain orientation of diamond wire 15 between pulleys 52, 72 as generally perpendicular to rails 30, 40, while carriers 55, 75 with attached pulleys 56, 76 are traversed equally along rails 30, 40, respectively, opposite to the traversal of carriers 51, 71 with attached pulleys 52, 72 to maintain diamond wire 15 at the selected tension.

As would be readily recognized by those of ordinary skill in the art upon study of this disclosure, one or more hydraulic hoses (not shown) may communicate with frame 12, for example, to power hydraulic drive motors 61, 63, 81, 83, to power chain motors 165, 175, and to hydraulically position clamp arms 16, 18. Various electrical pathways may communicate electrical power with frame 12, and lights and/or video camera(s) may be provided about frame 12, in various implementations. Frame 12 may include instrumentation to detect operations of, for example, hydraulic drive motors 61, 63, 81, 83, chain motors 165, 175, clamp arms 16, 18, and diamond wire 15, and frame 12 may include controls for the control thereof. For example, a tachometer can be provided for measuring the angular velocity of pulleys 61, 63, 81, 83. A slip clutch can be provided and coupled with hydraulic drive motors 61, 63, 81, 83 and/or chain motors 165, 175, and may be set to release pressure at any desired threshold. A load cell may be provided to adjust tension of diamond wire 15 during cutting. An optical pyrometer may be provided for measuring the temperature of diamond wire 15 during cutting. Various sensors such as temperature sensor to sense temperature proximate frame 12, motion sensor to sense motions of frame 12, pressure sensor to sense the depth of frame 12, flow sensors to detect water velocity proximate frame 12, and so forth may be disposed about frame 12. Various cables, connectors, and so forth may be secured to attachments provided about frame 12 to allow frame 12 to be positioned with respect to workpiece 199. Various controls may be located remotely of frame 12 to control frame 12 including, for example, hydraulic drive motors 61, 63, 81, 83, chain motors 165, 175, clamp arms 16, 18, and diamond wire 15, In operation, frame 12 including interior region 11 may be sized to accommodate workpiece 199 prior to deployment. One or more connectors, such as connector 34, may be interposedly connected between end sections 32, 36 to adjust the length of rail 30, and one or more connectors, such as connector 44, may be interposedly connected between end sections 42, 46 to adjust the length of rail 40, in correspondence to the length of rail 30, thereby sizing interior region 11. One or more connectors, such as connector 94, may be interposedly connected between sections 92, 96 to adjust the length of base 20, thereby sizing interior region 11. After sizing of interior region 11 of frame 12, the lengths of chains 132, 134, 142, 144 and the length of diamond wire 15 are adjusted accordingly, and the size, shape, or position of clamp arms 16, 18 may be altered according to the size of frame 12 and/or workpiece 199.

Thus, frame 12 may be sized to accommodate workpiece 199 having various sizes within interior region 11 by selective inclusion of either no sections or one or more sections in frame 12, such as section 34 in rail 30, section 44 in rail 40, and section 94 in base 20. Multiple sections, such as section 34 in rail 30, section 44 in rail 40, and section 94 in base 20, may be included in frame 12 to accommodate a large workpiece 199. By inclusion or exclusion of sections, such as section 34 in rail 30, section 44 in rail 40, and section 94 in base 20, frame 12 including interior region 11 may be sized to allow cutting of variously sized workpieces using diamond wire 15.

After being sized, frame 12 may be deployed by being lowered underwater to depth and clamped to workpiece 199 using clamp arms 16, 18. Frame 12 may be lowered into place by crane. In certain implementations, frame 12 may be positioned by remotely operated vehicle without the aid of divers, thereby increasing the settings in which diamond wire saw apparatus 10 including frame 12 may be deployed. It should be noted that diamond wire saw apparatus 10 may be deployed in dry land settings including locations that are not amenable to direct human access.

With frame 12 clamped to workpiece 199, loop 17 of diamond wire 15 is then cycled about pulleys 52, 54, 56, 58, 62, 64, 72, 74, 76, 78, 82, 84 driven by hydraulic drive motors 61, 63, 81, 83 that power pulleys 62, 64, 82, 84, respectively. As diamond wire 15 is cycled, pulleys 52, 72 are traversed from proximate ends 31, 41 toward ends 33, 43 of rails 30, 40, respectively to advance portions of diamond wire 15 between pulleys 52, 72 through workpiece 199 by cutting workpiece 199. Pulleys 56, 76 are traversed from ends 33, 43 toward ends 31, 41 of rails 30, 40 concurrent with the traversal of pulleys 52, 72 from ends 31, 41 toward ends 33, 43 of rails 30, 40, respectively, in order to maintain diamond wire 15 at the selected tension. Pulleys 52, 56, 72, 76 are traversed to advance portions of diamond wire 15 between pulleys 52, 72 toward ends 33, 43 as diamond wire 15 cuts workpiece 199. Alternatively, workpiece 199 may be cut by traversing portions of diamond wire 15 between pulleys 52, 72 generally from ends 33, 43 toward ends 31, 41 of rails 30, 40.

Pulleys 52, 56 mechanically cooperate with chains 132, 134, respectively, that, in turn, mechanically cooperate with chain motor 165 to traverse pulleys 52, 56 along rail 30, in this implementation. Pulleys 72, 76 mechanically cooperate with chains 142, 144, respectively, that, in turn, mechanically cooperate with chain motor 175 to traverse pulleys 72, 76 along rail 40, in this implementation.

The foregoing discussion along with the Figures discloses and describes various exemplary implementations. These implementations are not meant to limit the scope of coverage, but, instead, to assist in understanding the context of the language used in this specification and in the claims. The Abstract is presented to meet requirements of 37 C.F.R. § 1.72(b) only. Accordingly, the Abstract is not intended to identify key elements of the apparatus and methods disclosed herein or to delineate the scope thereof. Upon study of this disclosure and the exemplary implementations herein, one of ordinary skill in the art may readily recognize that various changes, modifications and variations can be made thereto without departing from the spirit and scope of the inventions as defined in the following claims.

The invention claimed is:

1. A diamond wire saw apparatus, comprising:
   a frame having a first rail and a second rail secured to a base, the first rail and the second rail being parallel to one another and perpendicular to the base;
   several pulleys disposed about the frame;
   a diamond wire engaged with the several pulleys to be cycled about the several pulleys, portions of the several pulleys traverse portions of the frame in opposing directions to maintain a selected tension in the diamond wire as the diamond wire is advanced to cut a workpiece releasably engaged with the frame;
   wherein the first rail has a first rail first end and a first rail second end and at least one removable first rail connector connecting the first rail first end to the first rail second end;
   wherein the second rail has a second rail first end and a second rail second end and at least one removable second rail connector connecting the second rail first end to the second rail second end;
   wherein the base has a base first end and a base second end and at least one removable base connector connecting the base first end to the base second end; and
   wherein the at least one removable first rail connector, the at least one removable second rail connector, and the at least one removable base connector are removable so that an interior region of the frame is adjustable in size to accommodate a workpiece within the interior region of the frame.

2. The apparatus of claim 1, further comprising:
   at least one hydraulic drive motor engaged with the frame to cycle the diamond wire about the several pulleys.

3. The apparatus of claim 1, further comprising:
   a chain motor hydraulically powered that cooperates mechanically via chain with two pulleys of the several pulleys to traverse the two pulleys in opposite directions as the diamond wire is advanced to cut the workpiece.

4. The apparatus of claim 1, wherein the diamond wire is adjustably tensionable to a selected tension.

5. The apparatus of claim 4, wherein said apparatus is submerged when engaged with the workpiece.

6. The apparatus of claim 1, further comprising:
a clamping mechanism to releasably engage a workpiece to the frame for cutting by the diamond wire.

7. A diamond wire saw apparatus, comprising:
a base having multiple hydraulic drive motors, each hydraulic drive motor rotates a corresponding pulley;
a first rail that extends perpendicular to the base with a first carrier and corresponding first pulley disposed proximate the base and a second carrier and a corresponding second pulley disposed proximate an end furthest from the base;
a second rail that extends perpendicular to the base with a third carrier and corresponding third pulley disposed proximate the base and a fourth carrier and a corresponding fourth pulley disposed at a second end furthest from the base;
a diamond wire engaged with the pulleys, the first carrier and the third carrier traversed together away from the base as the second carrier and the fourth carrier are traversed toward the base to maintain constant tension in the diamond wire while the diamond wire is cycled by the hydraulic drive motors; and
wherein the first rail, the second rail, and the base are formed in sections to be sized to accommodate a workpiece within an interior region defined by inclusion or exclusion of sections in the first rail, the second rail, and the base.

8. The apparatus of claim 7, further comprising:
a chain motor hydraulically powered that cooperates mechanically with the first carrier and the second carrier to traverse the first carrier and the second carrier simultaneously in opposite directions along the first rail; and
a second chain motor hydraulically powered that cooperates mechanically with the third carrier and the fourth carrier to traverse the third carrier and the fourth carrier simultaneously in opposite directions along the second rail.

9. The apparatus of claim 7, wherein the diamond wire is adjustably tensionable to a selected tension.

10. The apparatus of claim 7, further comprising:
a clamping mechanism to releasably engage a workpiece for cutting by the diamond wire.

11. The apparatus of claim 10, wherein said apparatus is submerged when engaged with the workpiece.

12. A wire saw apparatus, comprising:
a frame having a first rail and a second rail secured to a base, the first rail and the second rail being parallel to one another and perpendicular to the base;
a plurality of pulleys disposed about the frame;
a cutting wire engaged with the plurality of pulleys to be cycled about the plurality of pulleys, portions of the plurality of pulleys traverse portions of the frame in opposing directions to maintain a selected tension in the cutting wire as the cutting wire is advanced to cut a workpiece releasably engaged with the frame;
wherein the first rail has a first rail first end and a first rail second end and at least one removable first rail connector connecting the first rail first end to the first rail second end;
wherein the second rail has a second rail first end and a second rail second end and at least one removable second rail connector connecting the second rail first end to the second rail second end; and
wherein the at least one removable first rail connector and the at least one removable second rail connector are removable so that an interior region of the frame is adjustable in size to accommodate a workpiece within the interior region of the frame.

13. The apparatus of claim 12, wherein the base has a base first end and a base second end and at least one removable base connector connecting the base first end to the base second end, wherein the at least one removable base connector is removable so that an interior region of the frame is further adjustable in size to accommodate a workpiece within the interior region of the frame.

14. The apparatus of claim 12, further comprising:
at least one hydraulic drive motor engaged with the frame to cycle the cutting wire about the several pulleys.

15. The apparatus of claim 12, further comprising:
a chain motor hydraulically powered that cooperates mechanically via chain with two pulleys of the several pulleys to traverse the two pulleys in opposite directions as the cutting wire is advanced to cut the workpiece.

16. The apparatus of claim 12, wherein the cutting wire is adjustably tensionable to a selected tension.

17. The apparatus of claim 12, further comprising:
a clamping mechanism to releasably engage a workpiece to the frame for cutting by the cutting wire.

* * * * *